Figure 1:
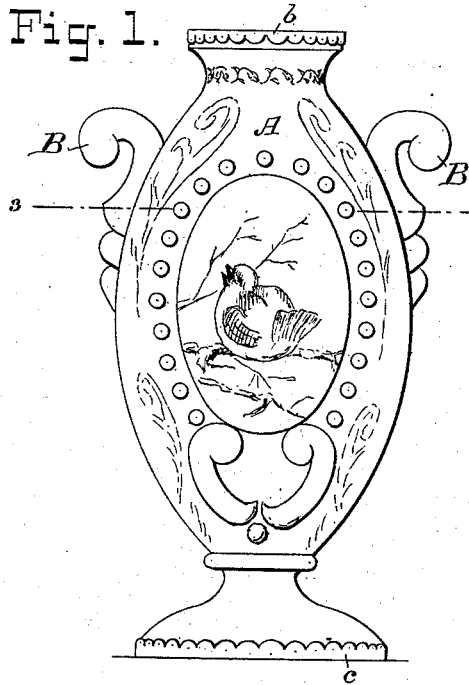

(No Model.)

W. T. MURPHY.
GLASS VASE, URN, AND OTHER HOLLOW GLASSWARE, AND IN THEIR MANUFACTURE.

No. 268,266.  Patented Nov. 28, 1882.

WITNESSES:
Geo. H. Fraser.
Geo. B. Pattleton.

INVENTOR:
William T. Murphy,
By his Attorneys,
Burke, Fraser Bennett

UNITED STATES PATENT OFFICE.

WILLIAM T. MURPHY, OF NEW YORK, N. Y.

GLASS VASE, URN, OR OTHER HOLLOW GLASSWARE, AND THEIR MANUFACTURE.

SPECIFICATION forming part of Letters Patent No. 268,266, dated November 28, 1882.

Application filed September 9, 1882. (No model.)

*To all whom it may concern:*

Be it known that I, WILLIAM T. MURPHY, a resident of the city, county, and State of New York, have invented certain Improvements in Glass Vases, Urns, and other Hollow Glass Articles, and in their Manufacture, of which the following is a specification.

My invention relates to glass vases, urns, lamp-standards, lamp-cylinders, and other hollow glass articles which are painted or decorated on the interior. These articles are now commonly made of blown glass in one piece, of cylindrical or other hollow form. The top or bottom end of the article is left open, or both ends are left open, and all the inside painting or decorating is done through these openings by inserting the hand of the operator holding the brush or pencil through such opening into the interior of the article. The moisture evaporated from the warm hand of the operator soon condenses on the inner surface of the glass, forming there a "sweat" or film of moisture which prevents the colors adhering to the glass, so that the painting can only be continued for a few minutes at a time, it being necessary to stop at intervals and permit this sweat to dry off. The cramped position of the hand when in the vase, too, renders it difficulty to do fine painting, and this difficulty is enhanced by the necessity of viewing the work that is being done on the front side of the vase through the thickness of glass forming the back thereof, which, being of uneven thickness and unequal quality, distorts any object seen through it. For these reasons every kind of interior hand-decorating is more expensive than that done on the exterior of the article, and there is the further disadvantage that only one side of the vase can be decorated, for after the front is covered with paint it is impossible for the operator to see the back in order to paint it. When the article is small or has a neck too small to admit the hand it is impossible to paint its interior surface by hand, and resort is had to inserting pasted or transfer pictures. Color is then flowed in or brushed over the interior surface of the vase to render the remaining portion of the glass opaque. In many cases the neck or mouth of the article is made disproportionately large in order to enable it to be decorated by hand.

The object of my invention is to obviate the above-described disadvantages, to render the decorating of the articles cheap and comparatively easy, and to enable the articles to be made in certain shapes that cannot be blown. To this end I form the vase or other article in two or more sections divided longitudinally, each half or section being a shell made of pressed glass. I then paint or decorate the inner surface of each half or shell, and finally join them together edge to edge, thereby forming the completed article.

Figure 2:
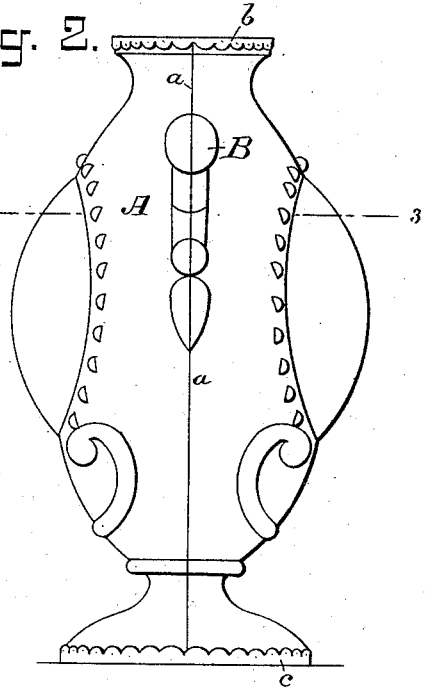
Figure 3:
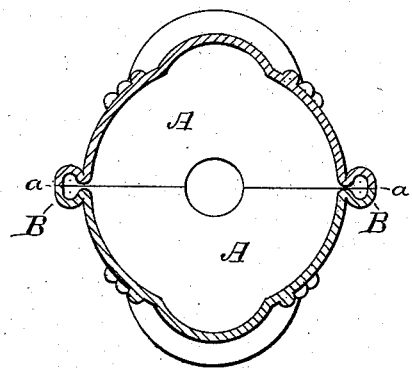
Figure 4:
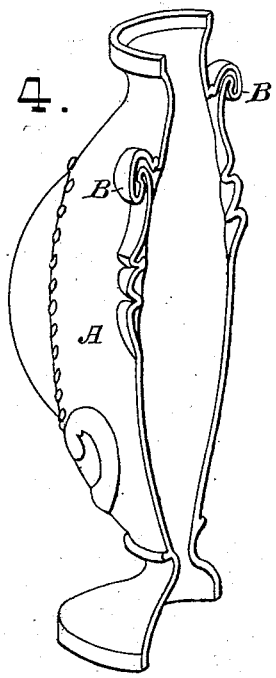

Figure 1 of the accompanying drawings is a front elevation of a vase made according to my invention. Fig. 2 is a side elevation thereof. Fig. 3 is a transverse horizontal section thereof, cut in the plane of the line 3 3; and Fig. 4 is a perspective view of one of the halves or shells of which it is formed.

I have here shown the vase as divided vertically or longitudinally into two equal halves or shells, which are lettered A A. Each shell A is pressed in a die, in the manner commonly followed in making pressed-glass articles, as will be well understood. Care should be taken to make the meeting edges of the two shells to truly and accurately conform to each other, in order that when they are put together the joint or seam *a* will be close and nearly imperceptible. Each shell A, after being formed and finished, is painted or decorated on its inner or concave surface. This operation can be performed with the utmost ease and freedom, because the entire inner surface is exposed and accessible to the workman, so that they can be painted with as much facility as the exterior of a vase. There is no sweating of the surface, consequently the work can proceed rapidly and without intermission. The workman can clearly see his work, and consequently works with precision, making fewer erroneous strokes than when working on the inside of the vase. Whenever it becomes necessary for him to observe the effect of his work he has only to turn the shell over and look at the design through the glass. The two shells are painted separately, thus decorating both the front and back of the vase, and are then fitted together edge to edge, as shown in Figs. 2 and 3. They may be fastened with any good cement, or they may have bands of metal or other material passed around them, or caps or rings of metal may be stamped or spun up and fitted over their ends, or one of their ends. In the drawings I have shown two metal rings, b and c, applied to the vase, the ring b embracing its neck, and the ring c inclosing its foot or base. If the exterior surface of the vase or other article is decorated, it is easy to entirely conceal the seam a with a line of guilt or color; but even without this it will be scarcely perceptible.

My invention admits of a novel and pleasing effect not before attainable by painting the two shells with grounds of different colors which harmonize with each other, so that the front half of the vase will present a ground of one color and the back half a ground of a different color. Thus either half may be turned toward the spectator, as taste may dictate.

One important advantage of my invention is the ability that I thus gain to make certain shapes and designs that it would be impossible to form in blown glass. Thus the handle or ornament B in Figs. 1 and 2, which constitutes a considerable projection from the general surface of the vase, and which curves upward, as shown, could not be formed by blowing the glass into a mold, as it would be impossible by blowing to force the glass to enter the deep and curved depression in the mold necessary to form this handle. The glass might be blown into it a short distance, but could not be made to reach its extremity; but by dividing the vase vertically into two halves or shells on a plane passing through these handles or projections, as shown in Figs. 2 and 4, each shell may be pressed in a die, and the handles B B will be perfectly formed, whether of solid glass or made hollow, as shown in Figs. 3 and 4.

I claim as my invention—

1. The improvement in the art of manufacturing hollow glass vases, urns, and other similar articles having decorations on their interior surfaces, which consists in forming two or more shells of pressed glass, each of which constitutes a half or other segment of the vase or other article divided longitudinally, painting or decorating each such shell on its interior or concave surface, and finally uniting the shells edge to edge, whereby is formed a complete vase or other article decorated on its interior surface, substantially as set forth.

2. The combination, to form a hollow glass vase, urn, or other similar article, of two or more shells of pressed glass, each constituting a half or other segment of the vase or other article divided longitudinally, each shell being decorated on its inner or concave surface, and the shells being fastened together edge to edge to form the complete vase, substantially as set forth.

3. The combination of two shells, A A, made of pressed glass with edges conformed to each other, so that when united edge to edge they will form a complete vase, urn, or other hollow article, and each shell formed with a half or part of a projecting handle or other prominent projection, B B, on each side and integral with it, whereby, when joined together, these halves coincide and form handles or projecting ornaments for the vase or other article, substantially as set forth.

In witness whereof I have hereunto signed my name in the presence of two subscribing witnesses.

WILLIAM T. MURPHY.

Witnesses:
ARTHUR C. FRASER,
HENRY CONNETT.